United States Patent [19]
Daniels

[11] Patent Number: 6,089,077
[45] Date of Patent: Jul. 18, 2000

[54] MASS FRACTION BURNED AND PRESSURE ESTIMATION THROUGH SPARK PLUG ION SENSING

[75] Inventor: Chao Fu Daniels, Ypsilanti, Mich.

[73] Assignee: Cooper Automotive Products, Inc., Houston, Tex.

[21] Appl. No.: 08/883,346

[22] Filed: Jun. 26, 1997

[51] Int. Cl.[7] .................................................. G01M 15/00
[52] U.S. Cl. ........................................ 73/35.08; 73/35.03
[58] Field of Search .............................. 73/35.01, 35.03, 73/35.06, 35.08, 116, 117.3

[56] References Cited

U.S. PATENT DOCUMENTS

| | | |
|---|---|---|
| Re. 32,301 | 12/1986 | Latsch et al. . |
| 4,307,603 | 12/1981 | Dobler et al. . |
| 4,359,893 | 11/1982 | Kizler et al. . |
| 4,372,270 | 2/1983 | Latsch et al. . |
| 4,426,987 | 1/1984 | Latsch et al. . |
| 4,624,229 | 11/1986 | Matekunas .............................. 123/425 |
| 5,050,556 | 9/1991 | Williams et al. ....................... 123/425 |
| 5,396,176 | 3/1995 | Ishii et al. . |
| 5,544,635 | 8/1996 | Hara et al. .............................. 123/425 |

OTHER PUBLICATIONS

Michael F.J. Brunt et al.; "Evaluation of Burn Rate Routines and Analysis Errors"; Society of Automotive Engineers, Inc. pp. 19–29.

Andre Saitzkoff et al.; "An Ionization Equilibrium Analysis of the Spark Plug as an Ionization Sensor"; 1996; Society of Automotive Engineers, Inc.; pp. 157–162.

Gerald M. Rassweiler et al.; "Motion Pictures of Engine Flames Correlated with Pressure Cards"; Jan. 14, 1938 and 2/25–29/80; pp. 1–20.

Andre Saitzkoff et al.; "In–Cylinder Pressure Measurements Using the Spark Plug as an Ionization Sensor"; 1997; Society of Automotive Engineers, Inc.; pp. 187–197.

*Primary Examiner*—Eric S. McCall
*Attorney, Agent, or Firm*—Fish & Richardson, P.C.

[57] ABSTRACT

Mass fraction burned in a cylinder of an internal combustion engine is determined by measuring an ion signal across a gap of a spark plug and identifying an inflection point of the ion signal. The mass fraction burned is determined using an expression that includes a constant. A value for the constant is determined using the inflection point of the ion signal, and the mass fraction burned is determined using the expression and the constant.

25 Claims, 11 Drawing Sheets

MASS FRACTION BURNED AND PRESSURE ESTIMATION THROUGH SPARK PLUG ION SENSING

BACKGROUND

The invention relates to determining the mass fraction burned and cylinder pressure in an internal combustion engine.

Mass fraction burned and cylinder pressure are important parameters in characterizing the combustion process in a cylinder of an internal combustion engine. Traditionally, the mass fraction burned has been determined from the measured cylinder pressure based on the Rassweiler-Withrow Procedure established in 1938. In this procedure, the beginning and end of the combustion process are identified by examining the relationship between cylinder pressure (P) and volume (V) plotted on logarithmic scales, as shown in FIG. 12. The relationship between log P and log V during compression and expansion, in the absence of combustion, is linear. Therefore, the beginning and end of combustion can be determined by identifying the points 900 and 910 where the log P to log V relationship departs from the linear characteristic during compression and expansion. Once the beginning 900 and the end 910 of the combustion process are determined, the mass fraction burned during combustion can be evaluated based on pressure and volume through the following equation:

$$x_b = (P^{1/n}V - P_0^{1/n}V_0)/(P_f^{1/n}V_f - P_0^{1/n}V_0)$$

where the subscripts 0 and f indicate the beginning and the end of the combustion process, respectively, and n is a polytropic exponent. The polytropic exponent may change throughout the combustion process and from cycle to cycle in an unpredictable manner, which may affect the reliability and applicability of the Rassweiler-Withrow approach. In addition, this approach requires a pressure sensor in the cylinder.

SUMMARY

The invention permits the mass fraction burned and pressure in a cylinder of an internal combustion engine to be determined using an ion signal from a spark plug. The ion signal, which corresponds to a current passing through the spark plug gap, is responsive to conditions in a cylinder during the combustion process.

In one aspect, generally, the invention features determining mass fraction burned in a cylinder of an internal combustion engine by measuring an ion signal across a gap of a spark plug and identifying an inflection point of the ion signal. Mass fraction burned then is determined using the inflection point.

Embodiments of the invention may include one or more of the following features. The mass fraction burned may be represented using an expression that includes a constant. A value for the constant may be determined using the inflection point, and the mass fraction burned may be determined by a calculation using the expression and the value of the constant within that expression. The inflection point may correspond to a maximum flame acceleration point.

Mass fraction burned may be calculated by identifying a second inflection point of the ion signal, representing the mass fraction burned using an expression that includes two constants, determining values for the constants using the inflection points, and determining the mass fraction burned using the expression and the values of the constants. The first inflection point may correspond to a maximum flame acceleration point. The second inflection point may correspond to a maximum heat release point. The pressure in the cylinder due to combustion may be determined using the mass fraction burned.

In another aspect, generally, the invention features determining mass fraction burned by measuring an ion signal across a spark plug gap, determining a maximum flame acceleration point and a maximum heat release point from the measured ion signal, and using the maximum heat release point and the maximum flame acceleration point to determine a constant of a function that represents mass fraction burned. Mass fraction burned then is determined using the function.

In another aspect, generally, the invention features determining the pressure in the cylinder during the combustion process by determining an initial cylinder pressure, determining an ignition point of a combustion process from the measured ion signal, determining a combustion termination point from the measured ion signal, and determining pressure in the cylinder due to combustion from the ignition point to the combustion termination point using the mass fraction burned. Pressure in the cylinder due to movement of a piston in the cylinder from the ignition point to the combustion termination point also may be determined. Finally, a total pressure in the cylinder from the ignition point to the combustion termination point may be determined by combining the pressure due to combustion with the pressure due to movement of the piston in the cylinder.

In yet another aspect, the invention features a device for measuring a spark plug ion signal. The device includes a measurement circuit configured to measure the current across a gap of the spark plug and a microprocessor connected to the measurement circuit. The microprocessor may be configured to identify an inflection point of the ion signal and determine mass fraction burned using the inflection point.

The microprocessor may be configured to represent the mass fraction burned using an expression that includes a constant, to determine a value for the constant using the inflection point, and to determine the mass fraction burned using the expression and the value of the constant.

The device may be implemented in an internal combustion engine that includes a cylinder, a piston configured to move up and down within the cylinder, and a spark plug projecting into the cylinder. The spark plug may have a gap configured to ignite a fuel/air mixture in the cylinder, and an ion signal measurement circuit. The ion signal measurement circuit may be configured to measure an ion signal across the gap of the spark plug, to identify an inflection point of the ion signal, and to determine mass fraction burned using the inflection point.

Other features and advantages of the invention will be apparent from the following description, including the drawings, and from the claims.

DESCRIPTION

Figure 1:
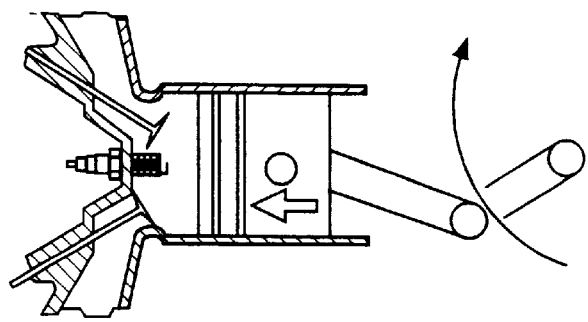
FIG. 1 is an illustration of the four cycles of a four-stroke internal combustion engine.
Figure 1:
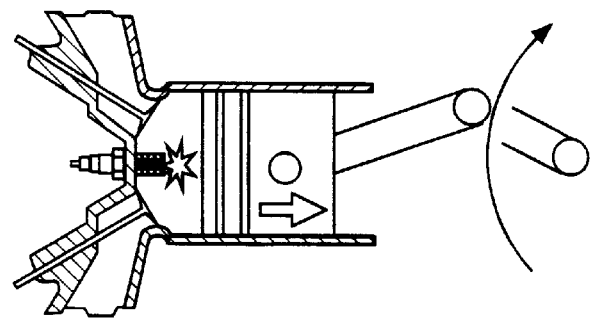
Figure 1:
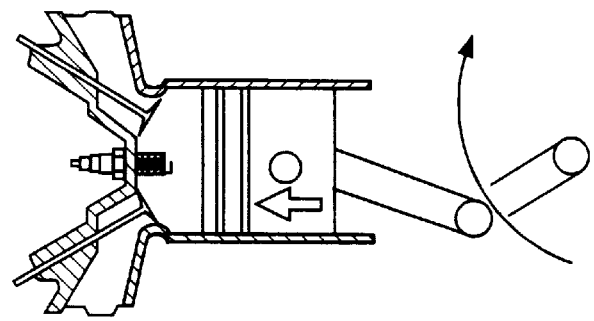
Figure 1:
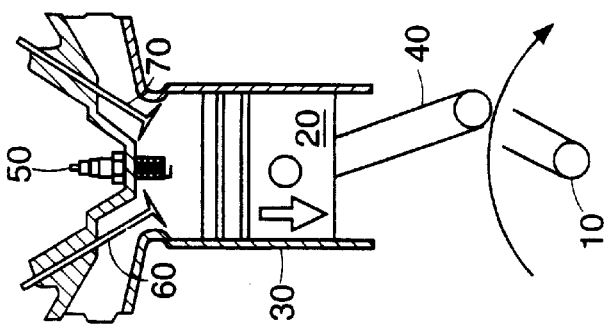

The operation of an internal combustion engine can be described by a series of cycles or strokes. Most engines use two-stroke or four-stroke operation. For example, in a typical automobile engine, the operation can be divided into four cycles: intake, compression, expansion and exhaust, as shown in FIG. 1. The four cycles occur during two rotations of the crankshaft 10, so that the crankshaft rotates through a crank angle of 720° during the four cycles. The crankshaft is connected to a piston 20 within each cylinder 30 by a connecting rod 40. The piston 20 moves up and down within the cylinder 30 as the crankshaft 10 rotates. During the intake cycle, the piston 20 moves down (away from a spark plug 50 of the cylinder), an intake valve 60 opens, and an exhaust valve 70 closes, to allow a mixture of air and fuel to be drawn into the cylinder 30. During the compression stroke, the piston moves up and the valves close to compress the fuel/air mixture and increase the temperature and pressure in the cylinder. Near the end of the compression cycle, the spark plug 50 ignites the fuel/air mixture, which initiates combustion. In the expansion cycle, the combustion process greatly increases the pressure within the cylinder 30 and forces the piston 20 down, which provides driving force to the crankshaft 10.

In general, the combustion process in a spark ignition engine is composed of the following stages: combustion initiation (including ignition and flame kernel development), combustion propagation (including flame acceleration and maximum heat release), and combustion termination. To initiate combustion, a high voltage (8–30 kV) is applied across a spark plug gap. This results in the breakdown, or ionization, of the gaseous molecules in the cylinder into charged particles (ions). The ions act as current carriers, allowing a current to flow across the spark plug gap. Ion formation occurs in the fuel/air mixture to a differing extent in each stage of combustion. The current flowing across the spark plug gap, or ion signal, directly depends on the extent of ion formation. The ion signal may be used to calculate the mass fraction burned, or fraction of fuel energy released, as a function of crank angle. The mass fraction burned, in turn, may be used to calculate the cylinder pressure.

The mechanisms of ion formation in a flame are: thermal ionization of impurities, thermal ionization of reaction products and intermediates with low ionization potentials, thermal ionization of carbon particles, ionization through non-equilibrated translational energy, cumulative excitation, and chemical ionization. A decay in ionization, referred to as ion recombination, follows the ion formation process. Ion recombination can be achieved through chemical recombination, collision with a cold surface, or neutralization by other ions or electrons. An ion signal measured at a particular time is actually a measure of the balance between the ion formation and recombination.

Figure 2:
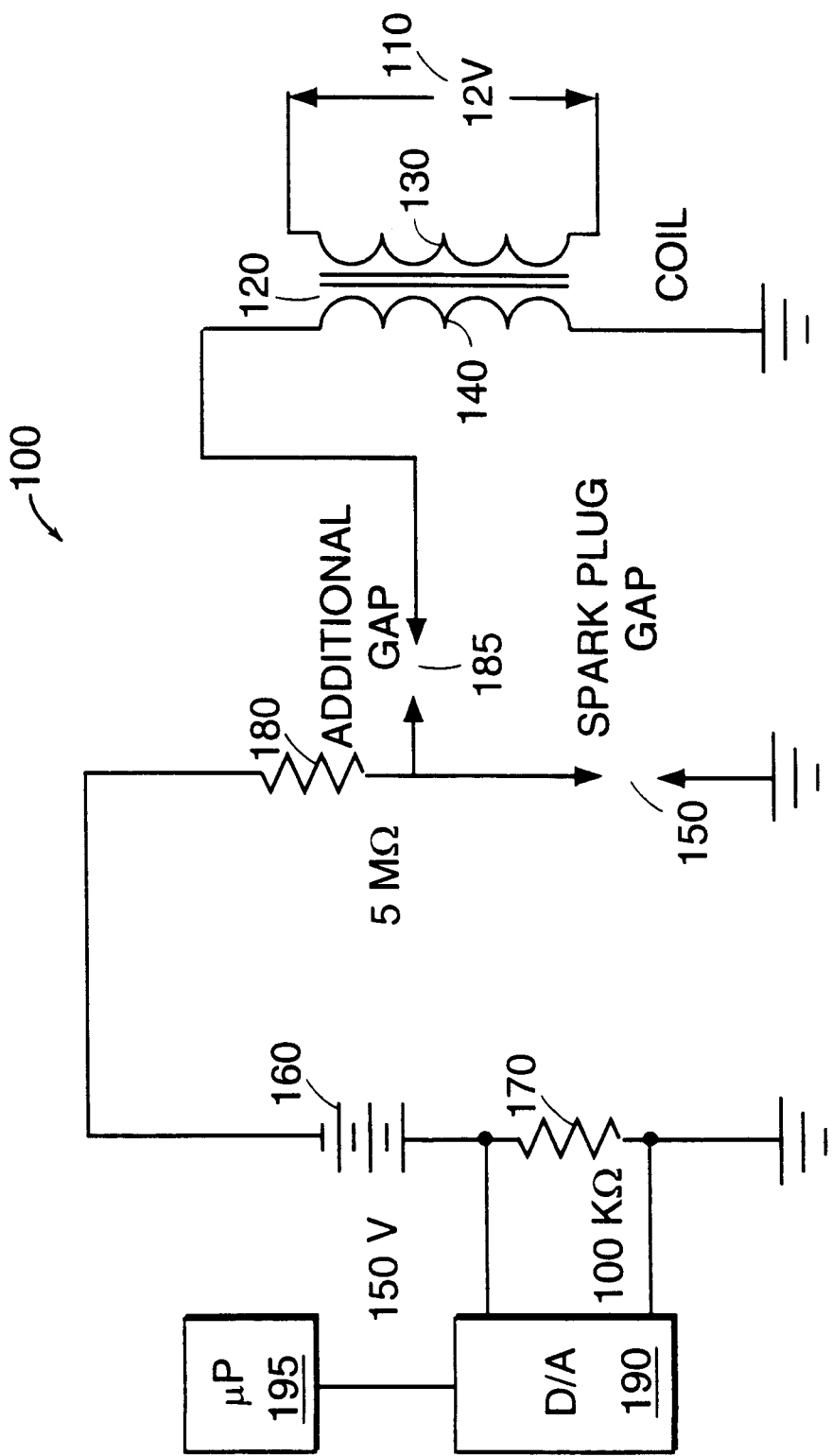
FIG. 2 is a schematic of a circuit for measuring the ion signal of a spark plug.

FIG. 2 shows an embodiment of a spark plug ion signal measurement circuit 100 incorporated in a typical vehicle ignition system. The ignition system includes a 12 V source (battery) 110 and an ignition coil 120. The ignition coil 120 is a transformer that steps up the source voltage on the primary coil 130 to a higher voltage (typically 8–30 kV) on the secondary coil 140. The voltage on the secondary coil is used to generate a spark across the spark gap 150. An additional 150 V direct current voltage source 160 is applied across a 100 kΩ resistor 170 and a 5 MΩ resistor 180 which are arranged in series with the spark gap 150. The additional source 160, which may be supplied by the car battery through a transformer, increases the current flowing across the spark gap 150 so that the ion signal can be measured more easily. An additional gap 185 with a breakdown voltage of approximately 3 kV is provided between the ion signal measurement circuit (i.e., the source 160, the resistors 170, 180, and the spark gap 150) and the secondary coil 140 to prevent the ion signal measurement circuit from being grounded through the secondary coil 140. The ion signal is measured by a digital-to-analog converter 190 across the 100 kΩ resistor 170. The ion signal measurement is then transmitted to a microprocessor 195 that is configured to perform mass fraction burned and pressure calculations.

Figure 3:
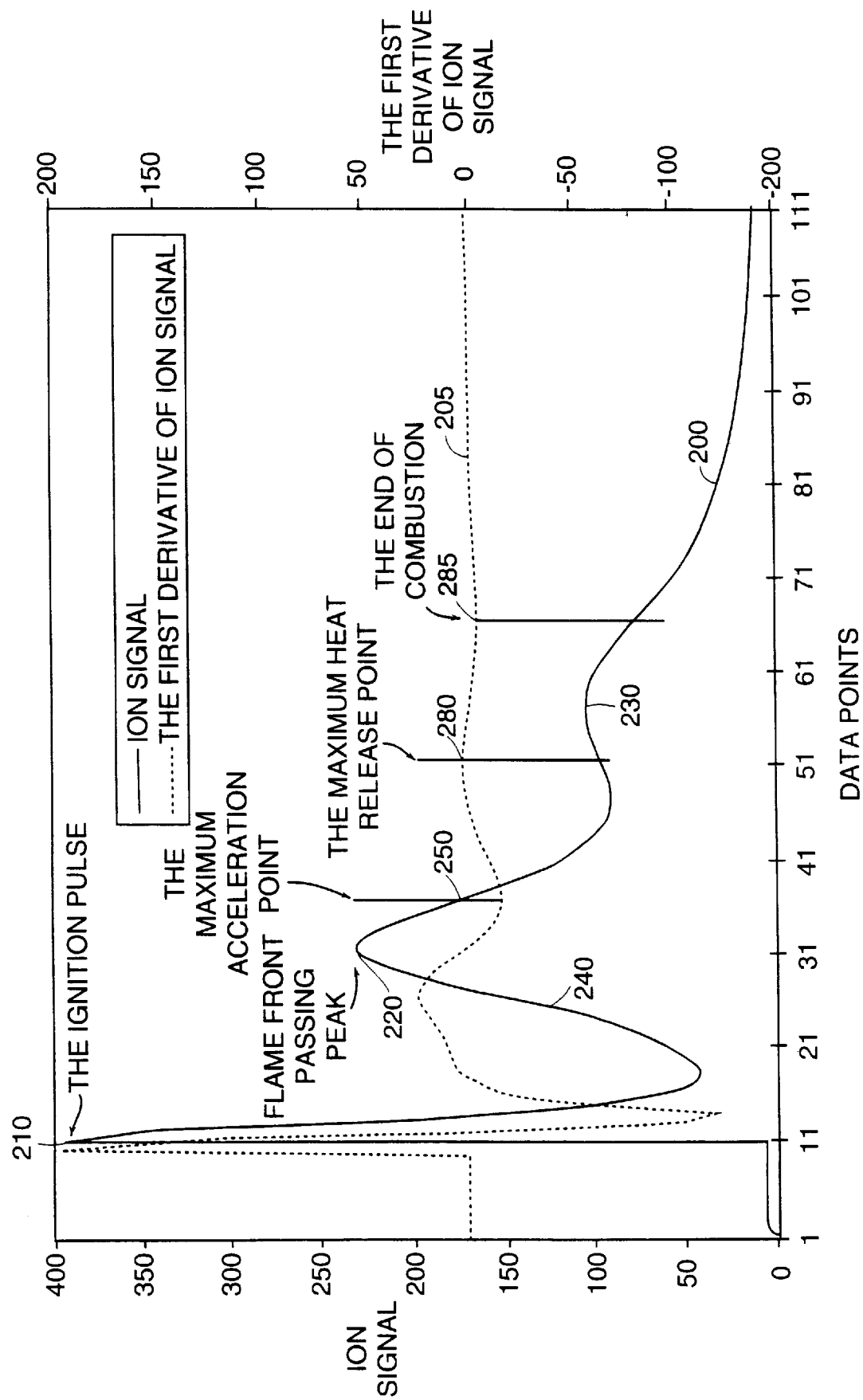
FIG. 3 is a graph of an ion signal.

An ion signal waveform 200 for an engine cylinder is shown in FIG. 3, which is a graph of time (measured data points) versus scaled ion signal voltage. The ion signal waveform has three peaks which are related to important events during the combustion process: ignition, flame kernel development, and flame propagation. The first derivative 205 of the ion signal is also useful in determining the duration of the stages of the combustion process.

The first peak 210 of the ion signal is the ignition point of the combustion. In a normal engine cycle, after the ignition pulse, a flame kernel starts to form and grow between the spark plug gap. The ion current gradually increases in a period 240 due to the flame front passing through the spark plug gap during the early flame development stage. The ions formed during this process are mainly the result of chemical ionization.

Toward the end of the flame front, the ion signal reaches the second peak 220 and declines as the flame front moves away. Since the ion signal represents the balance between the ion formation and recombination, the peaks in the ion signal represent points where the rate of formation equals the rate of recombination. After the second peak 220, the rate of ion formation resulting from chemical ionization gradually declines. The inflection point 250 after the second peak 220 is the maximum flame acceleration point, which marks the end of ion formation due to the flame front and the start of flame propagation toward the deeper part of the cylinder. This also marks the end of the early flame development portion of the combustion process, which occurs before the flame reaches its maximum acceleration point after departure from the spark plug gap.

Figure 4:
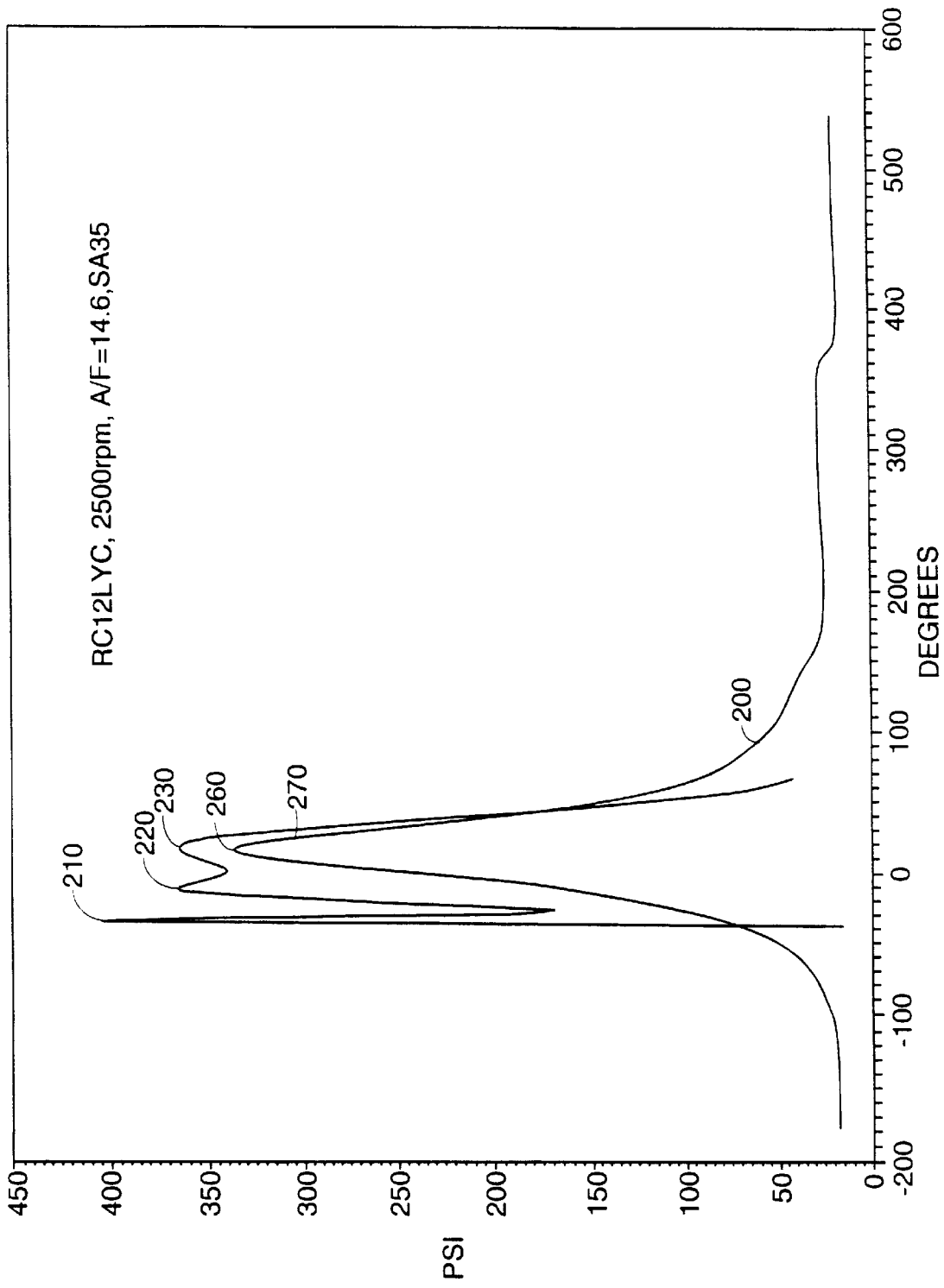
FIG. 4 is a graph of an ion signal and a pressure signal.
Figure 5:
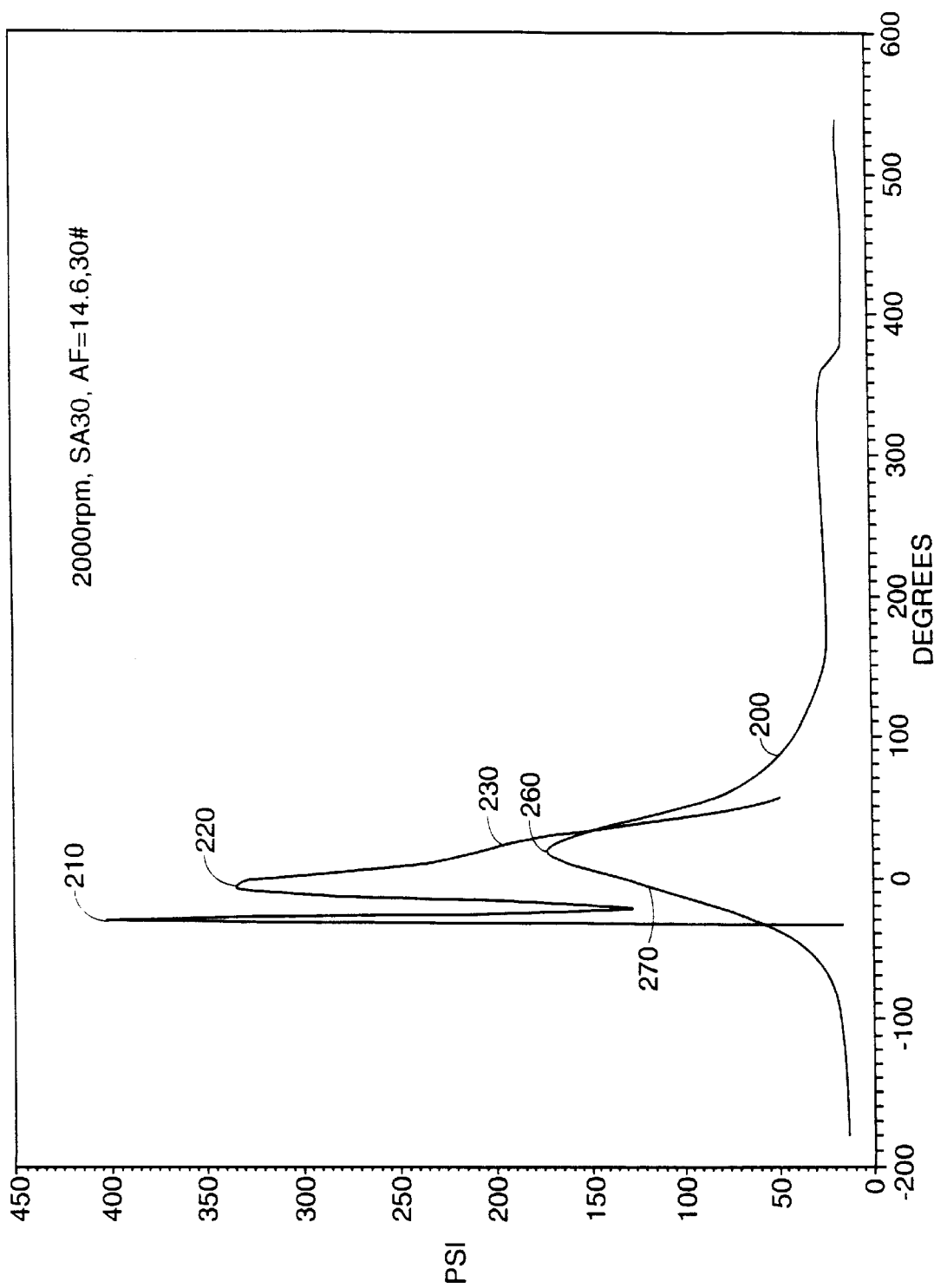
FIG. 5 is a graph of an ion signal and a pressure signal.

As the flame front propagates away from the spark plug, the burned gas in the vicinity of the spark plug is compressed by the moving flame and forced back toward the spark plug. Some of the reaction products, other molecules (such as $N_2$), or carbon molecules remaining in the gap, which are already at a very high temperature, are ionized due to the temperature increase resulting from this compression. This ionization results in the third peak 230 in the ion signal. FIGS. 4 and 5 are graphs of crank angle (which depends on time and engine speed) versus measured cylinder pressure. As shown in FIG. 4, the third peak 230 usually matches the peak pressure 260 point of the cylinder pressure characteristic 270. As shown in FIG. 5, at low load or late spark timing conditions, the third peak 230 may be hidden by the second peak 220 but a small hump in the ion signal waveform 200 will still appear.

The local temperature around the spark plug increases with combustion strength. Therefore, the rate of ion formation or recombination around the spark plug is directly related to the heat release rate of the combustion in progress near the spark plug. The heat release rate, or the fuel-air mixture burning rate, reaches its maximum about halfway through the combustion process. At this point, the ion formation rate is also at a maximum. When the combustion terminates, ion formation ceases and the ion recombination rate starts to increase. As shown in FIG. 3, the points at which the slope of the first derivative of the ion signal 205 equals zero correspond to the inflection points 250, 280 and 285 in the ion signal 200. The inflection point 250 in the ion signal after the second peak 220 indicates the maximum flame acceleration point, the inflection point 280 prior to the third peak 230 indicates the maximum heat release point, and the inflection point 285 after the third peak 230 indicates the end of the combustion process.

Figure 6:
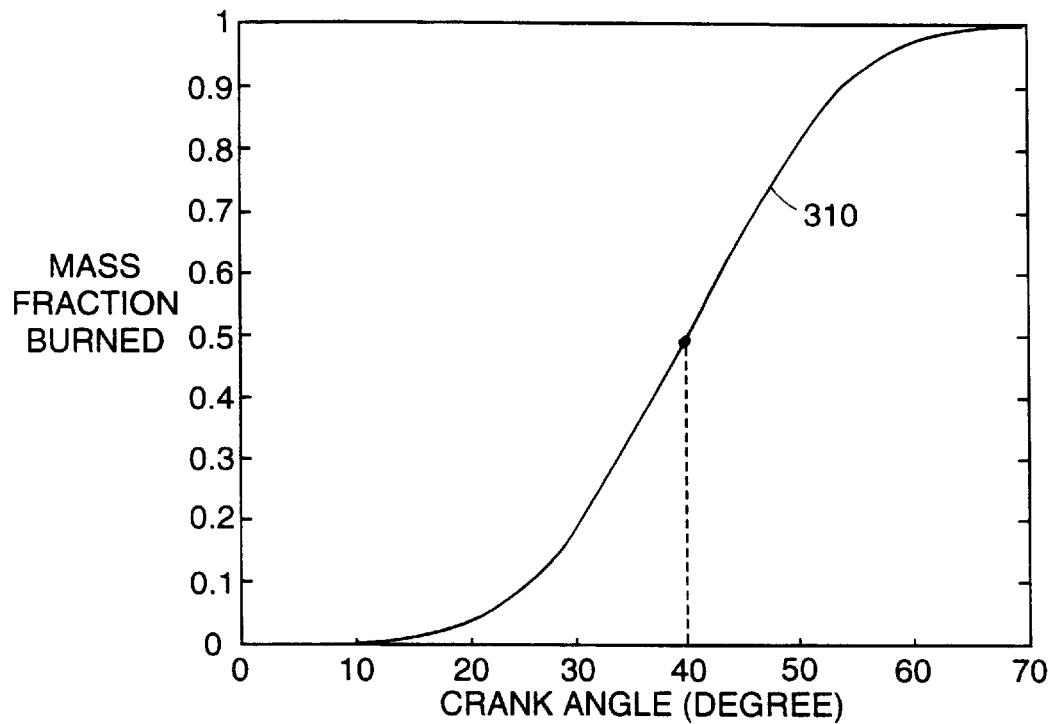
FIG. 6 is a graph of mass fraction burned.
Figure 7:
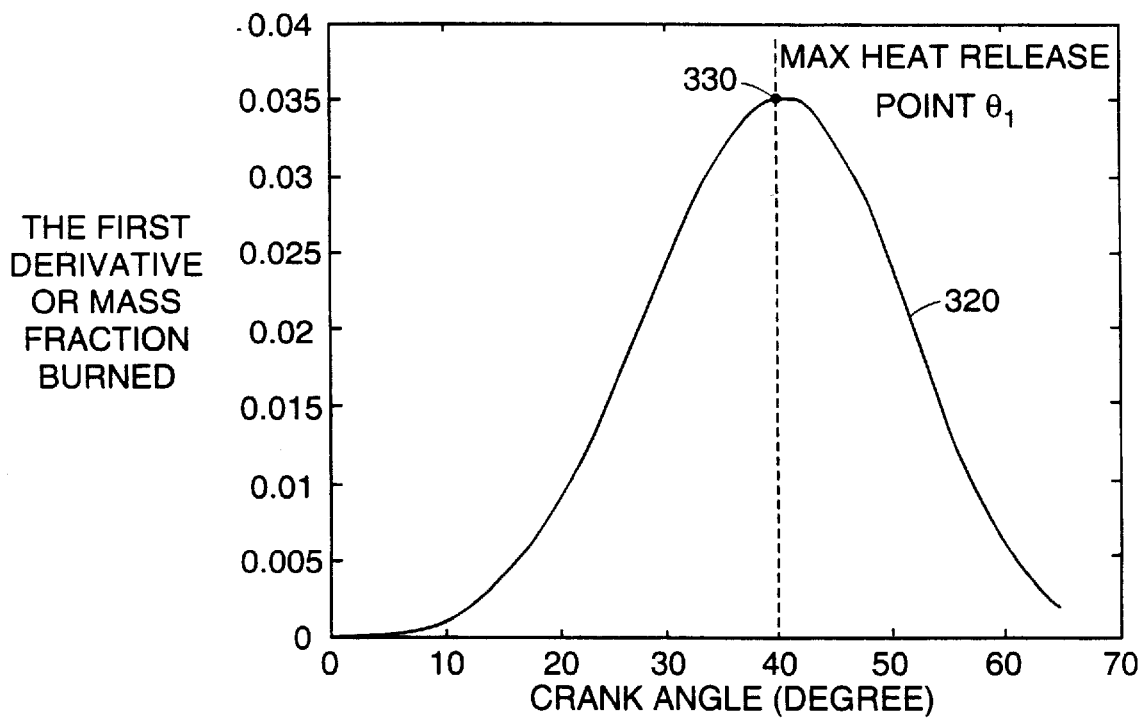
FIG. 7 is a graph of the first derivative of mass fraction burned.
Figure 8:
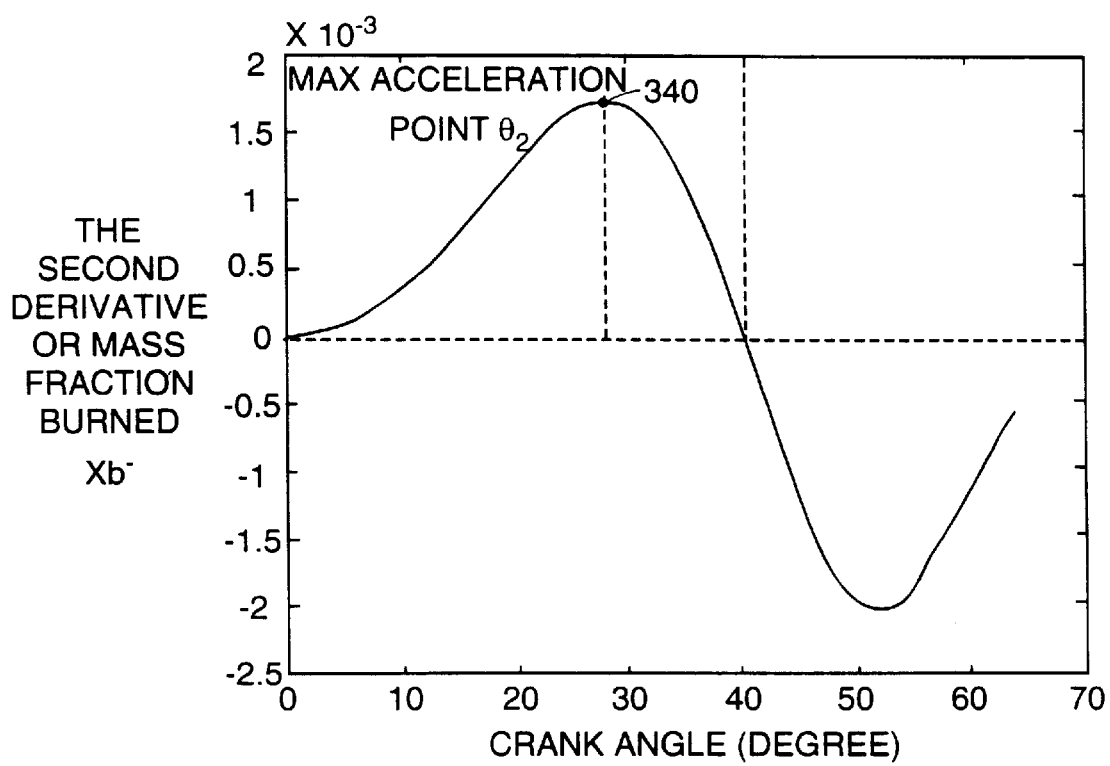
FIG. 8 is a graph of the second derivative of mass fraction burned.

FIGS. 6–8 are graphs of crank angle versus mass fraction burned and the derivatives of mass fraction burned, which can be used to characterize the combustion process. The mass fraction burned 310, as shown in FIG. 6, is the footprint of the combustion process in an engine cylinder. The crank angle versus mass fraction burned curve 310 has a characteristic S-shape, and increases from zero at the beginning of the combustion process to one at the end of the combustion process. As shown in FIG. 7, the rate at which fuel-air mixture burns, i.e. the derivative 320 of mass fraction burned, increases from zero following the ignition to a peak 330 approximately halfway through the combustion process and then decreases to zero as the combustion process ends. The second derivative of mass fraction burned, as shown in FIG. 8, reaches the point 340 of maximum combustion acceleration after the early flame development at about 10% mass burned and reaches the lowest acceleration at about 90% mass burned.

Figure 9:
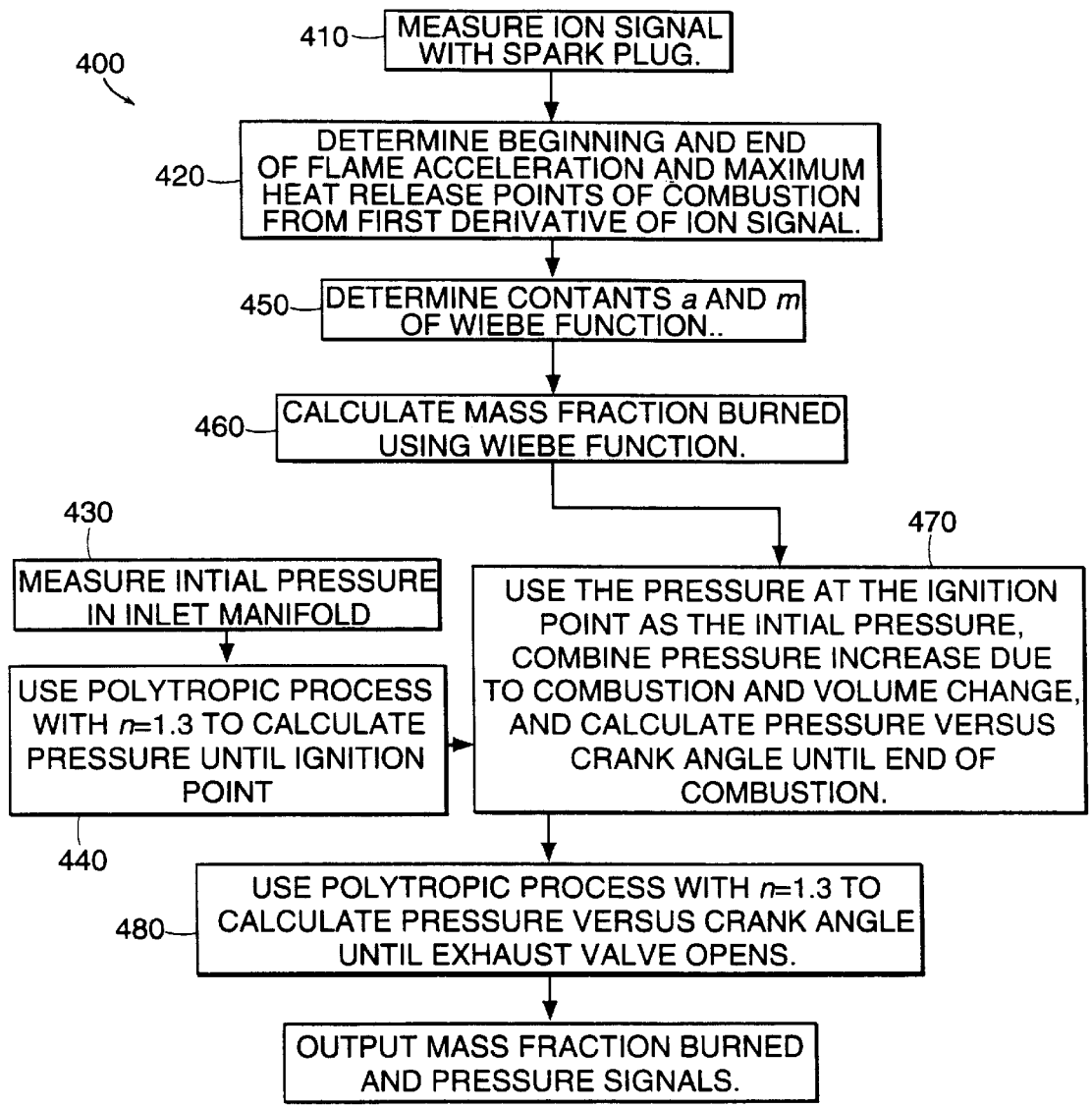
FIG. 9 is a flow chart of a method for determining mass fraction burned and cylinder pressure.

The mass fraction burned and cylinder pressure may be determined using the spark plug ion signal, rather than a pressure sensor, according to a procedure 400 shown in FIG. 9. Initially, the ion signal is measured across the spark gap in a cylinder (step 410). The starting and end points of the combustion process are determined from the ion signal and the first derivative of the ion signal as described above (step 420).

Before the combustion process begins, the pressure-volume characteristic in the cylinder closely follows the polytropic process with n=1.3, as given by the equation:

$$PV^n = \text{constant}$$

To determine this pre-combustion characteristic, the initial manifold pressure is obtained through the intake manifold pressure sensor (MAP sensor) (step 430) and the pressure in the cylinder from the point at which the inlet valve is closed up to the ignition point is determined using the expression provided above (step 440).

During the combustion process, the fuel consumption percentage versus the crank angle, or mass fraction burned, can be described by the Wiebe function:

$$x_b = 1 - \exp(-a((\theta - \theta_0)/\Delta\theta)^{m+1})$$

where $a$ and $m$ are constants, $\theta$ is the crank angle during the combustion, $\theta_0$ is the crank angle of ignition, and $\Delta\theta$ is the duration of the combustion. The ignition point, combustion termination point, maximum flame acceleration point, and maximum heat release point can be determined from a mathematical evaluation of the measured ion signal as described above. If the second derivative of the Wiebe function at the maximum heat release point is set to zero, and the third derivative of the Wiebe function at the maximum acceleration point is set to zero, the constants $a$ and $m$ can be determined (step 450). The mass fraction burned versus crank angle then can be calculated (step 460) using the Wiebe function and the pressure increase due to combustion can be calculated from the mass fraction burned. The pressure due to combustion then can be combined with the calculated pressure increase due to cylinder volume change to calculate the total pressure (step 470).

As shown in FIG. 3, at the maximum heat release point 280, the slope of the first derivative 205 of the ion signal equals zero. Therefore, the second derivative of the ion signal equals zero. Setting the second derivative of the Wiebe function equal to zero at the crank angle corresponding to the maximum heat release point 280 yields the following equation:

$$x_b'' = d^2 x_b / d\theta^2 = 0$$

At the crank angle corresponding to the maximum acceleration point, the third derivative of the Wiebe function equals zero:

$$x_b''' = d^3 x_b / d\theta^3 = 0$$

The constants $a$ and $m$ of the Wiebe function can be determined using these relationships.

After the inlet valve is closed and before the ignition occurs, the mixture in the cylinder may be assumed to be undergoing polytropic compression with a polytropic exponent of n=1.3. If the initial pressure is obtained through inlet manifold pressure sensor, the pressure at the ignition point ($P_{ig}$) can be determined as follows:

$$P_{int} V_{int}^{1.3} = P_{ig} V_{ig}^{1.3}$$

where $P_{int}$ is the initial cylinder pressure, $V_{int}$ is the initial cylinder volume, Pig is the pressure at the ignition point, and $V_{ig}$ is the volume at the ignition point.

After the ignition point, the pressure change due to combustion and piston motion can be calculated separately. An assumption can be made that combustion takes place in a constant volume equal to the volume at the ignition point. By combining the pressure change due to constant volume combustion with the pressure change due to piston movement, the pressure at each crank angle can be estimated.

For a constant volume combustion, the following energy equation may be used:

$$(m_a + m_f) C_v (T_f - T_{ig}) = m_f \Delta H_{comb}$$

where $m_a$ is the mass of the air, $m_f$ is the mass of the fuel, $C_v$ is the specific heat at a constant volume, $T_f$ is the temperature at the end of combustion, $T_{ig}$ is the temperature at the ignition point, and $\Delta H_{comb}$ is the heat of combustion. For a constant volume combustion, the following equation also is valid:

$$P_f / P_{ig} = T_f / T_{ig}$$

These equations may be combined to obtain the relationship between the pressure at the beginning of combustion and at the end of combustion:

$$P_f/P_{ig}=T_f/T_{ig}=m_f \Delta H_{comb}/[(m_a+m_f)C_v T_{ig}]+1$$

The pressure change between the beginning and the end of combustion is given by the following equations:

$$\Delta P=P_f-P_{ig}=[m_f \Delta H_{comb}/[(m_a+m_f)C_v T_{ig}]] \cdot P_{ig}$$

For certain fuels, the pressure change may depend on the air/fuel ratio and the temperature at the ignition point. However, for gasoline under stoichiometric conditions, the expression for pressure change varies only a little and is approximately given by the following equation:

$$\Delta P \approx 3 P_{ig}$$

After the Wiebe function is determined, the first derivative of the mass fraction burned is assumed to be equal to the percentage change in pressure versus crank angle during the combustion process:

$$dP/d\theta=dX_b/d\theta * \Delta P$$

If $P(i+1)-P(i)$ is the total pressure increment due to both combustion and piston movement between two crank angles and $P(i)*(V(i)/V(i+1))^{1.3}-P(i)$ is the pressure increment due to piston movement, then $P(i+1)-P(i)*(V(i)/V(i+1))^{1.3}$ is the pressure increment due to combustion. The pressure increment between two crank angles with reference to the volume at the ignition point is as follows:

$$dP(i)/d\theta(i)=dx_b(i)/d\theta(i)*\Delta P$$
$$=[P(i+1)-P(i)*(V(i)/V(i+1))^{1.3}]V(i)/V_{ig}$$

Finally, the pressure at each crank angle is:

$$P(i+1)=dx_b(i)/d\theta(i)*\Delta P*V_{ig}/V(i)+P(i)*[V(i)/V(i+1)]^{1.3}$$

Figure 10:
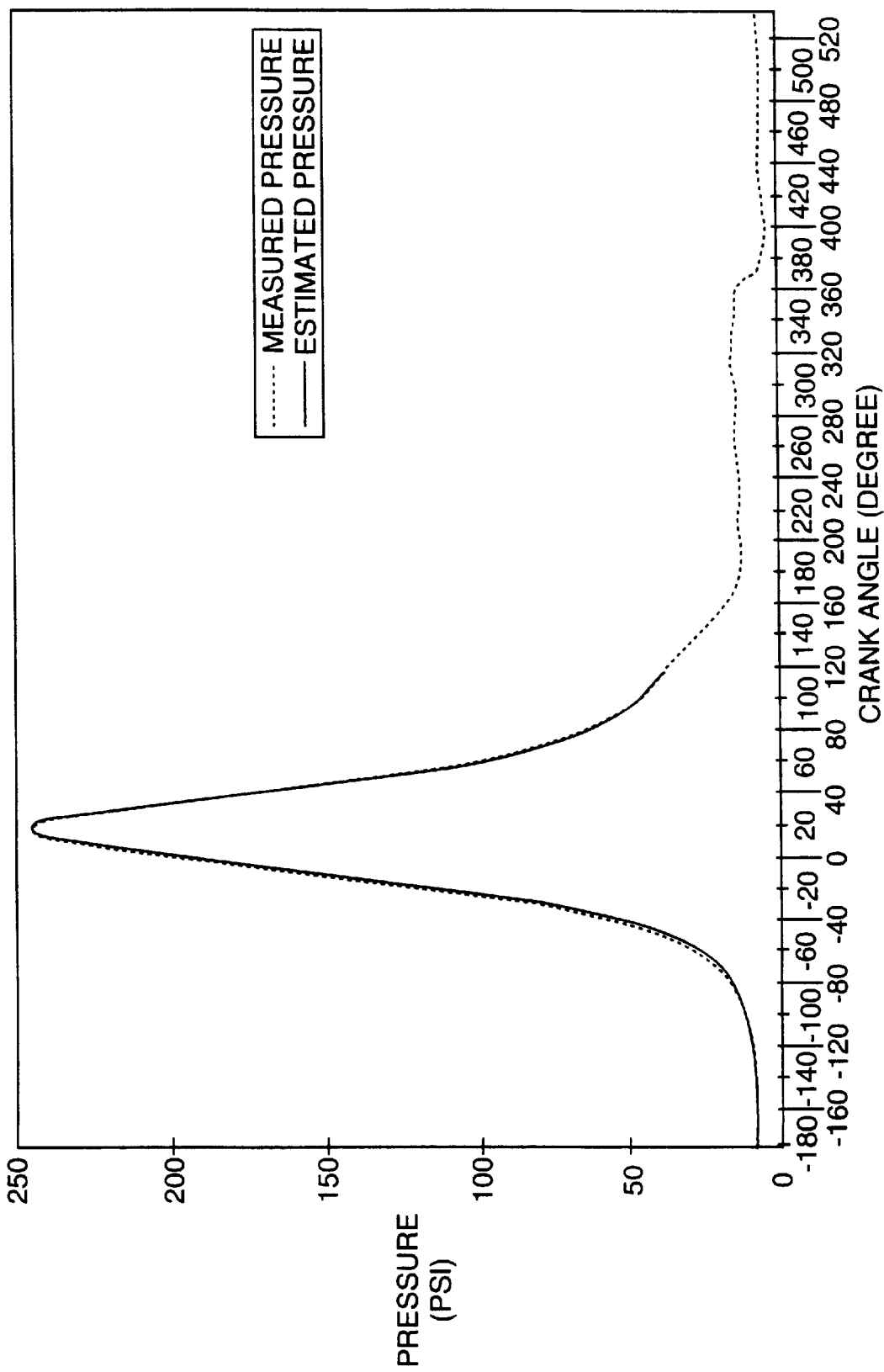
FIG. 10 is a graph of measured cylinder pressure compared to calculated cylinder pressure.

Referring again to FIG. 9, at the end of combustion, the polytropic process model, with n=1.3, is used again, and pressure is estimated until the exhaust valve opening point is reached (step 480). FIG. 10, which is a graph of crank angle versus cylinder pressure, shows that the cylinder pressure calculated from the measured ion signal is in significant agreement with that obtained from pressure sensor measurements.

The procedure 400 in FIG. 9 used to compute cylinder pressure from the ion signal relies on the inflection points in the ion signal and the derivatives of the ion signal rather than on the absolute level of the ion signal. This results in a more accurate determination of cylinder pressure, because the absolute level of the ion signal is subject to fluctuations that are unrelated to cylinder pressure.

For example, experimentation has shown that the ion signal is heavily dependent on factors unrelated to the cylinder pressure, such as the geometry of the spark plug electrode. Several spark plugs with different projections or electrode geometries were tested at the same engine operating conditions (i.e. engine speed and load were kept constant during the test). Although no significant differences developed in indicated mean effective pressure (IMEP) between different spark plug designs, the ion signals detected by different spark plugs showed large differences. All of the tests were performed in a Chrysler 3.5L, V6 engine in which the ion signal and pressure signal from the second cylinder were connected to a test measurement system and monitored.

Figure 11:
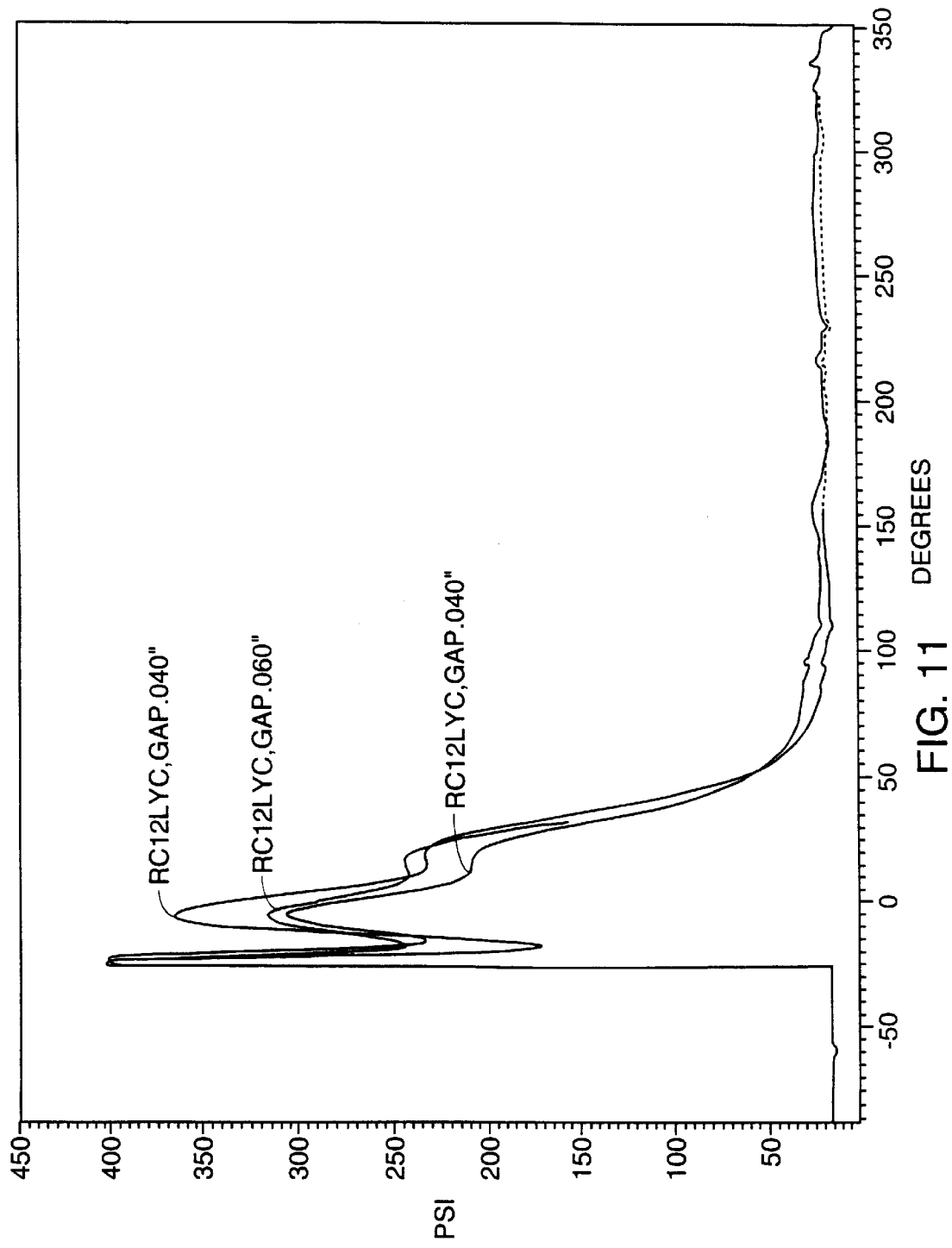
FIG. 11 is a graph of ion signals for different spark plug geometries.
Figure 12:
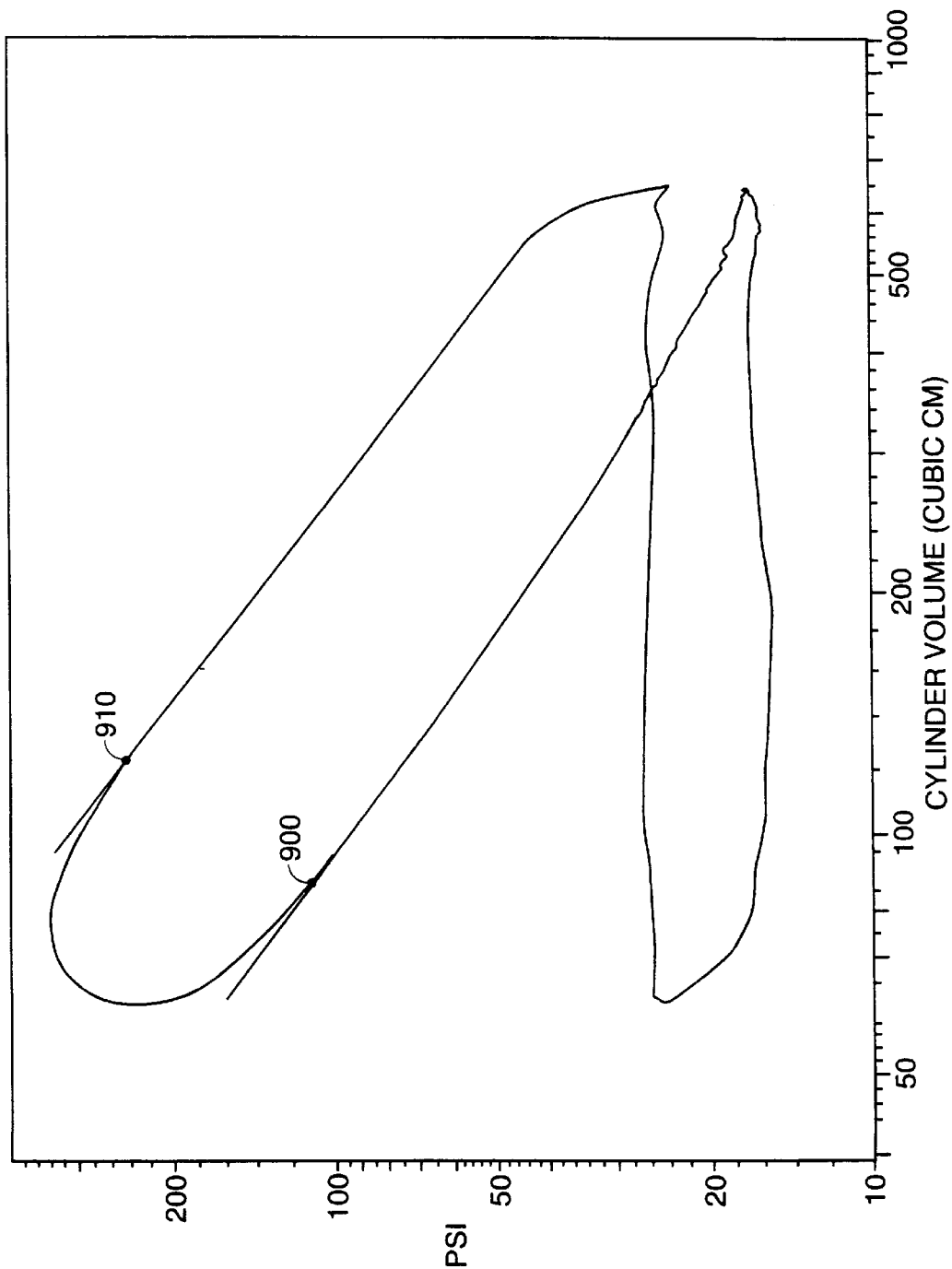
FIG. 12 is a logarithmic graph of cylinder volume versus cylinder pressure.

FIG. 11 shows the ion signal detected by the same RC12LYC spark plug with two different gaps: 0.040 inches and 0.060 inches. The signal detected by the spark plug with the larger gap is stronger than the smaller gap signal.

Similarly if the gap size is the same, but spark plugs with different projections are used (RC12LYC and RC12YC), the shorter projection spark plug measures a much stronger ion signal in comparison with the longer projection plug, because a greater accumulation of ions exists near the cylinder wall due to the slower flow of combustion gases.

The experimental results also show that a larger electrode size results in a stronger ion signal. The intensity of the ion signal also depends on the electrode surface temperature. For example, a copper core ground electrode, which has an electrode surface temperature lower than that of other designs, has higher ion intensity. This is because larger or colder electrode surfaces result in a higher ion recombination rate. Unless the ion recombination rate resulting from different electrode designs is considered, the calculation of flame temperature based on the ion signal is unreliable.

Other embodiments are within the scope of the following claims.

What is claimed is:

1. A method for determining mass fraction burned in a cylinder of an internal combustion engine comprising:
   measuring an ion signal across a gap of a spark plug,
   identifying an inflection point of the ion signal, and
   determining a mass fraction burned using the inflection point, wherein the inflection point corresponds to a maximum flame acceleration point.

2. The method of claim 1, further comprising:
   representing the mass fraction burned by an expression that includes a first constant, and
   determining a value for the first constant based on the inflection point,
   wherein determining the mass fraction burned comprises performing a calculation using the expression and the value for the first constant.

3. The method of claim 1, further comprising:
   identifying another inflection point of the ion signal,
   representing the mass fraction burned by an expression that includes first and second constants, and
   determining values for the first and second constants based on the inflection points,
   wherein determining the mass fraction burned comprises performing a calculation using the expression and the values for the first and second constants.

4. The method of claim 3, wherein the inflection point corresponds to the maximum flame acceleration point.

5. The method of claim 3, wherein the other inflection point corresponds to a maximum heat release point.

6. The method of claim 1, further comprising determining pressure in the cylinder based on the mass fraction burned.

7. A method for determining a mass fraction burned in a cylinder of an internal combustion engine comprising:
   measuring an ion signal across a gap of a spark plug,
   determining a maximum flame acceleration point from the measured ion signal,
   determining a maximum heat release point from the measured ion signal,
   representing the mass fraction burned using an expression that includes a constant,
   determining a value for the constant based on the maximum heat release point and the maximum flame acceleration point, and
   determining the mass fraction burned based on the expression.

8. The method of claim 7, further comprising determining a pressure in the cylinder by:

determining an initial cylinder pressure, determining an ignition point of a combustion process from the measured ion signal, determining a combustion termination point from the measured ion signal, determining pressure in the cylinder due to combustion from the ignition point to the combustion termination point using the mass fraction burned, determining pressure in the cylinder due to movement of a piston in the cylinder from the ignition point to the combustion termination point, and determining a total pressure in the cylinder from the ignition point to the combustion termination point by combining the pressure due to combustion with the pressure due to movement of the piston in the cylinder.

9. A device for measuring a spark plug ion signal, the device comprising:

a measurement circuit configured to measure a current across a gap of a spark plug as an ion signal, and a microprocessor connected to the measurement circuit, the microprocessor being configured to identify an inflection point of the ion signal and to determine mass fraction burned using the inflection point, wherein the inflection point corresponds to a maximum flame acceleration point.

10. The device of claim 9, further comprising:

a resistor connected to ground, a voltage source connected to the resistor, a spark plug having a first gap, the spark plug being connected between ground and the voltage source, and a second gap connected to a point between the voltage source and the spark plug and connected to an ignition circuit.

11. The device of claim 10, further comprising:

an ignition coil having a primary coil and a secondary coil, the secondary coil being connected between ground and the second gap, a second voltage source connected to the primary coil.

12. The device of claim 11, wherein the second gap has a breakdown voltage less than a breakdown voltage of the spark plug.

13. The device of claim 9, wherein the microprocessor is further configured to:

represent the mass fraction burned using an expression that includes a first constant, and determine a value for the first constant using the inflection point, wherein determining the mass fraction burned comprises performing a calculation using the expression and the first constant.

14. An internal combustion engine comprising:

a cylinder, a piston configured to move up and down within the cylinder, a spark plug projecting into the cylinder, the spark plug having a gap configured to ignite a fuel/air mixture in the cylinder, and an ion signal measurement circuit configured to measure an ion signal across the gap of the spark plug, identify a first inflection point of the ion signal, and determine mass fraction burned using the first inflection point, wherein the first inflection point corresponds to a maximum flame acceleration point.

15. A method for determining mass fraction burned in a cylinder of an internal combustion engine comprising:

measuring an ion signal across a gap of a spark plug, identifying an inflection point of the ion signal, and determining a mass fraction burned using the inflection point, wherein the inflection point corresponds to a maximum heat release point.

16. The method of claim 15, further comprising:

representing the mass fraction burned by an expression that includes a first constant, and determining a value for the first constant based on the inflection point, wherein determining the mass fraction burned comprises performing a calculation using the expression and the value for the first constant.

17. The method of claim 15, further comprising:

identifying another inflection point of the ion signal, representing the mass fraction burned by an expression that includes first and second constants, and determining values for the first and second constants based on the inflection points, wherein determing the mass fraction burned comprises performing a calculation using the expression and the values for the first and second constants.

18. The method of claim 17, wherein the other inflection point corresponds to a maximum flame acceleration point.

19. The method of claim 15, further comprising determining pressure in the cylinder using the mass fraction burned.

20. A device for measuring a spark plug ion signal, the device comprising:

a measurement circuit configured to measure a current across a gap of a spark plug as an ion signal, and a microprocessor connected to the measurement circuit, the microprocessor being configured to identify an inflection point of the ion signal and to determine a mass fraction burned using the inflection point, wherein the inflection point corresponds to a maximum heat release point.

21. The device of claim 20, further comprising:

a resistor connected to ground, a voltage source connected to the resistor, a spark plug having a first gap, the spark plug being connected between ground and the voltage source, and a second gap connected to a point between the voltage source and the spark plug and connected to an ignition circuit.

22. The device of claim 21, further comprising:

an ignition coil having a primary coil and a secondary coil, the secondary coil being connected between ground and the second gap, and a second voltage source connected to the primary coil.

23. The device of claim 22, wherein the second gap has a breakdown voltage less than a breakdown voltage of the spark plug.

24. The device of claim 20, wherein the microprocessor is further configured to:

represent the mass fraction burned using an expression that includes a first constant, and determine a value for the first constant using the inflection point, wherein determining the mass fraction burned comprises performing a calculation using the expression and the first constant.

25. An internal combustion engine comprising:

a cylinder, a piston configured to move up and down within the cylinder, a spark plug projecting into the cylinder, the spark plug having a gap configured to ignite a fuel/air mixture in the cylinder, and an ion signal measurement circuit configured to measure an ion signal across the gap of the spark plug, identify a first inflection point of the ion signal, and determine mass fraction burned using the first inflection point, wherein the first inflection point corresponds to a maximum heat release point.

* * * * *

UNITED STATES PATENT AND TRADEMARK OFFICE
CERTIFICATE OF CORRECTION

PATENT NO. : 6,089,077
DATED : July 18, 2000
INVENTOR(S) : Chao Fu Daniels

Page 1 of 1

It is certified that error appears in the above-identified patent and that said Letters Patent is hereby corrected as shown below:

<u>Column 6,</u>
Line 43, delete "Pig" and insert therefor -- $P_{ig}$ --.

<u>Column 7,</u>
Line 32, delete "$P(i+1)=dx_b(i)/d\theta(i)*\Delta P*V_{ig}/V(i)+P(i)*[V(i)/V(i+1)]^{1.3}$" and insert therefor -- $P(i+1)=dX_b(i)/d\theta(i)*\Delta P*V_{ig}/V(i)+P(i)*[V(i)/V(i+1)]^{1.3}$ --.

Signed and Sealed this

Twenty-sixth Day of February, 2002

Attest:

*Attesting Officer*

JAMES E. ROGAN
*Director of the United States Patent and Trademark Office*